(12) United States Patent
Matsumae et al.

(10) Patent No.: US 7,940,412 B2
(45) Date of Patent: May 10, 2011

(54) IMAGE FORMING APPARATUS WITH JOB INTERRUPTION HANDLING

(75) Inventors: Keisaku Matsumae, Osaka (JP); Toshiyuki Nakade, Osaka (JP); Seiji Onishi, Osaka (JP); Ken Nishio, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1103 days.

(21) Appl. No.: 11/702,872

(22) Filed: Feb. 6, 2007

(65) Prior Publication Data
US 2007/0188800 A1    Aug. 16, 2007

(30) Foreign Application Priority Data

Feb. 8, 2006 (JP) ................................ 2006-031511
Feb. 8, 2006 (JP) ................................ 2006-031512

(51) Int. Cl.
  G06F 15/00 (2006.01)
  G06F 3/12 (2006.01)
  G06K 1/00 (2006.01)

(52) U.S. Cl. ...................... 358/1.15; 358/1.13

(58) Field of Classification Search ............. 358/1.1, 358/1.13, 1.14, 1.15
See application file for complete search history.

(56) References Cited

U.S. PATENT DOCUMENTS

| 5,206,735 | A | * | 4/1993 | Gauronski et al. ............ 358/296 |
| 6,130,757 | A |   | 10/2000 | Yoshida et al. |
| 7,185,151 | B2 |  | 2/2007 | Michiie et al. |

FOREIGN PATENT DOCUMENTS

| JP | 9-311766 | 12/1997 |
| JP | 10-149367 | 6/1998 |
| JP | 2002-300336 | 10/2002 |
| JP | 2004-112363 | 4/2004 |
| JP | 2004-186930 | 7/2004 |

* cited by examiner

*Primary Examiner* — Douglas Q Tran
(74) *Attorney, Agent, or Firm* — Jordan and Hamburg LLP

(57) ABSTRACT

An image forming apparatus which includes: a job storage unit for storing a plurality of print jobs; an image forming unit for executing the print jobs stored in the job storage unit; and a job managing unit for managing an execution order of the print jobs performed by the image forming unit. The job managing unit includes: priority job managing portion which, during execution of a specific print job carried out according to an execution order set in advance, manages the image forming unit to suspend the specific print job and preferentially to execute another print job; and job continuation judging portion which, when completing a priority print job that is executed by the priority job managing portion, judges whether or not to continue execution of the specific print job based on a job execution state of the specific print job that is being executed when starting the priority print job.

7 Claims, 8 Drawing Sheets

FIG.5

| Type | | | | | | History | |
|---|---|---|---|---|---|---|---|
| ■ All ▼ | | | | | | | 01/02 ◀ ▶ |

| Reception Number | Time | Type | Job/Document title | User | State |
|---|---|---|---|---|---|
| 0001 | 00:00 | ▨ | Print/Proceedings | Tanaka | In action |
| 0002 | 00:01 | ▨ | Received FAX/ABC Inc. | System | Standby |
| 0003 | 00:02 | ▨ | Print/Estimation sheet | Satoh | Standby |
| 0004 | 00:02 | ▨ | Print/Proposal | Suzuki | Standby |
| 0005 | 00:03 | ▨ | Received FAX/DEF Inc. | System | Standby |

| All print Temporary suspension | Stop | Priority print | Save job | See information |
|---|---|---|---|---|

| Print job | Transmission job | Device/Communication | Paper/Expendable |
|---|---|---|---|

| Type | | | State | | History | | |
|---|---|---|---|---|---|---|---|
| ■ All ▶ | | | | | | | |

| Reception Number | Time | Type | Job/Document title | User | State | | |
|---|---|---|---|---|---|---|---|
| 0001 | 00:00 | ▨ | Print/Proceedings | Tanaka | Temporary suspension | ◀ | 01/02 ▶ |
| 0002 | 00:01 | ▨ | Received FAX/ABC Inc. | System | Standby | | |
| 0003 | 00:02 | ▨ | Print/Estimation sheet | Satoh | In action | | |
| 0004 | 00:02 | ▨ | Print/Proposal | Suzuki | Standby | | |
| 0005 | 00:03 | ▨ | Received FAX/DEF Inc. | System | Standby | | |

All print / Temporary suspension | Stop | Priority print | Save job | See information Print job | Transmission job | Device/Communication | Paper/Expendable

FIG.6

IMAGE FORMING APPARATUS WITH JOB INTERRUPTION HANDLING

BACKGROUND OF THE INVENTION

1. Field of the Invention

The present invention relates to an image forming apparatus that includes: a job storage unit for storing a plurality of print jobs; an image forming unit for executing the print jobs stored in the job storage unit; and a job managing unit for managing an execution order of the print jobs carried out by the image forming unit, wherein the job managing unit includes priority job managing portion which, during execution of a specific print job carried out according to the execution order set in advance, manages the image forming unit to suspend the specific print job and preferentially to execute another print job.

2. Description of the Background Art

In an image forming apparatus that is capable of receiving print jobs from a plurality of terminals and storing the print jobs by being connected to a public telephone circuit, a network, etc., the print jobs are normally executed according to a preset execution order, e.g. an order of receiving print jobs. Many of those apparatuses include an interrupt printing function that is capable of preferentially executing the print job which needs to be done urgently by temporarily interrupting the print job in action, when there is an urgent print job.

When using the interrupt printing function, however, there is a following shortcoming. That is, when the image forming apparatus uses a common discharge part for discharging output matters, output matters of the executed print job that is temporarily suspended and output matters of the interrupt printing job are mixed. Thus, a user who has instructed to carry out the interrupt printing job needs to check the mixed output matters to obtain the output matters of the interrupt printing job therefrom.

Japanese Unexamined Patent Publication H10-149367 therefore proposes an image forming apparatus which includes: image output means that executes a plurality of image jobs according to an output order that is based on a priority order given in advance to the plurality of image jobs to form and output images; priority order changing means that changes the priority order of a first image job that is in the second output order or thereafter to the highest priority order in accordance with a priority order change request; and control means which, when the priority order of the first image job that is changed by the priority order change means is higher than the priority order of a second image job whose output order is the first, changes the output order of the first image job and the output order of the second image job when it is before starting the execution of the second image job, and when the second image job is in action, determines whether or not to suspend the second image job and execute the first image job preferentially, depending on whether or not there is postprocessing to be carried out after forming the images of the first and second image jobs.

The above-described image forming apparatus includes a finisher-type discharge processing part having at least two mount parts which can be cut out depending on whether or not there is the postprocessing such as stapling to be performed. In this apparatus, the consistency in each job in the outputted form is not disturbed even when the priority order is changed for an urgent job. However, there may be cases where the priority output processing is not carried out depending on whether or not the first and second image jobs are subjected to the postprocessing after forming the images. In such cases, the priority order cannot be changed even when there is required an urgent output. Therefore, there is a room for further improvement in this image forming apparatus.

SUMMARY OF THE INVENTION

In view of the above-mentioned conventional technique, the object of the present invention is to provide an image forming apparatus which, during execution of a specific print job according to an execution order set in advance, can ensure the priority execution of another print job by suspending the specific print job, and prevent mixture of the output matters.

In order to achieve the above-mentioned object, the image forming apparatus according to the present invention includes: a job storage unit for storing the plurality of print jobs; the image forming unit for executing the print jobs stored in the job storage unit; and the job managing unit for managing the execution order of the print jobs carried out by the image forming unit, wherein the job managing unit includes: the priority job managing portion which, during execution of the specific print job carried out in accordance with the execution order set in advance, manages the image forming unit to suspend the specific print job and preferentially to execute another print job, and job continuation judging portion which, when completing a priority print job that is executed by the priority job managing portion, judges whether or not to continue execution of the specific print job based on a job execution state of the specific print job that is being executed when starting the priority print job.

Further, it is preferable that the job managing unit stand by without executing the specific print job when the job continuation judging portion judges that the specific print job that is being executed at the time of starting the priority print job is in a halted state.

Furthermore, it is preferable that the job managing unit continue execution of the specific print job after a prescribed time is passed in a waiting time of the specific print job.

Other aspects of the present invention will become clear by referring to the illustrative embodiments of the following description.

BRIEF DESCRIPTION OF THE DRAWINGS

FIG. 5 is an illustration for describing the print job state check screen that is displayed on the operation part;

FIG. 6 is an illustration for describing the print job state check screen that is displayed on the operation part;

DESCRIPTION OF THE PREFERRED EMBODIMENTS

The image forming apparatus of the present invention will be described by referring to a digital composite machine as an example.

Figure 2:
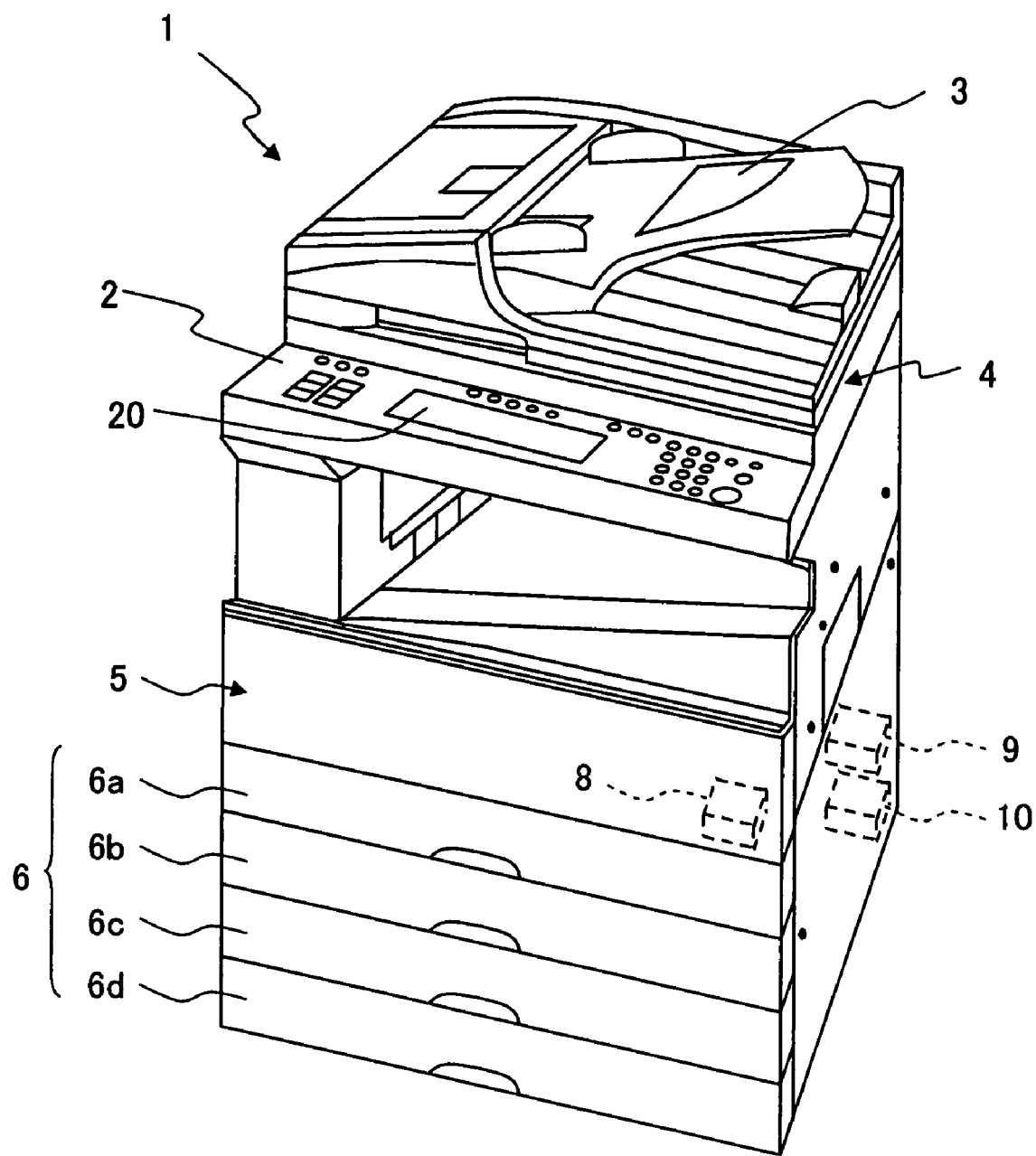
FIG. 2 is a perspective view for illustrating an appearance of a digital composite machine.

As shown in FIG. 2, a digital composite machine 1 includes: an operation part 2; an image reading part 4 for reading, in order, a series of manuscripts set in a manuscript mount part 3 and converting the contents to electronic data; an electrophotographic-type image forming unit 5 for forming toner images on paper and outputting those as the output matters based on image data that is converted to the electronic data by the image reading part 4, image data transmitted from an external FAX machine, image data transmitted from a personal computer (referred to as "PC" hereinafter), etc.; and a plurality of sheet cassettes 6 (6a-6d) on which paper of different sizes and kinds are placed; and the like.

In addition to having the operation part 2, the image reading part 4, and the image forming unit 5, the digital composite machine 1 also includes a FAX modem 9 for transmitting/receiving image data to/from the external FAX machine that is not shown in the figures, an external interface 10 for receiving image data from a plurality of PCs via a network LAN, and a control part 8 for generally controlling the digital composite machine 1.

Figure 3:
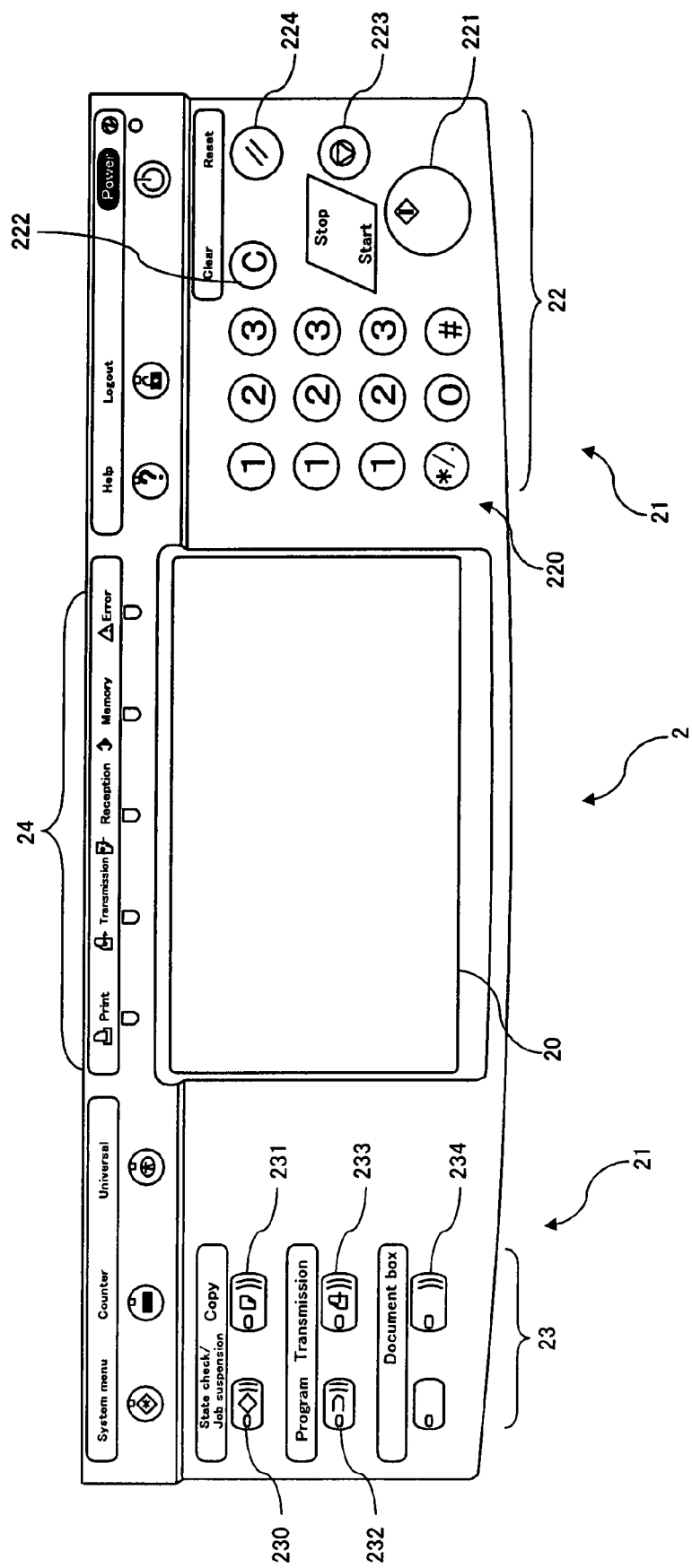
FIG. 3 is an illustration for describing an operation part of the digital composite machine.

Referring to the case of copy mode that copies and outputs the image data read in from a manuscript, for example, the operation part 2 is constituted with, as shown in FIG. 3: a touch-panel color display part 20 which displays an operation screen on which a plurality of menu selection keys for designating the copy condition are arranged in a form of software keys; hardware keys 21 including a start key for starting an image forming action, numerical value input keys and the like for setting the number of copies; a LED 24 for informing the current state of the digital composite machine 1 to the user; and an operation control part and the like for controlling the operational input from the various keys, and display output of the software keys to the color display part 20.

The hardware keys 21 are constituted with a fundamental control key group 22 arranged on a right side of the color display part 20 and a special mode setting key group 23 arranged on a left side of the color display part 20.

In a copy mode, for example, the fundamental control key group 22 is constituted with a "numerical value input" key 220 for setting the number of prints, a "start" key 221 for starting the print action, a "clear" key 222, a "stop" key 223, and a "reset" key 224, etc.

The special mode setting key group 23 includes, for example: a "state check/job suspension" key 230 which shifts to a state check mode for suspending or changing the print condition of the selected print job or the like by checking the state of the print job or the like of the digital composite machine 1; a "copy" key 231 for shifting to a copy mode; a "program" key 232 for shifting to a program mode that executes a corresponding job mode by calling programs in which the various job modes carried out in the digital composite machine 1 are programmed; a "transmission" key 233 for shifting to a FAX transmission mode; and a "document box" key 234 for shifting to a document box mode which stores characteristic image data for each user and executes the job by calling the stored image data.

The operation control part detects the operational input from the software keys displayed on the color display part 20 and the hardware keys 21 and outputs it to the control part 8, while informing the use mode and the like of the digital composite machine 1 to the user by controlling to putting off and on the LED 24 according to a command from the control part 8. Further, the software keys and the like are arranged on the touch-panel color display part 20, and operation screens prepared for each use mode, job list screen, etc. are changed for display.

Figure 4:
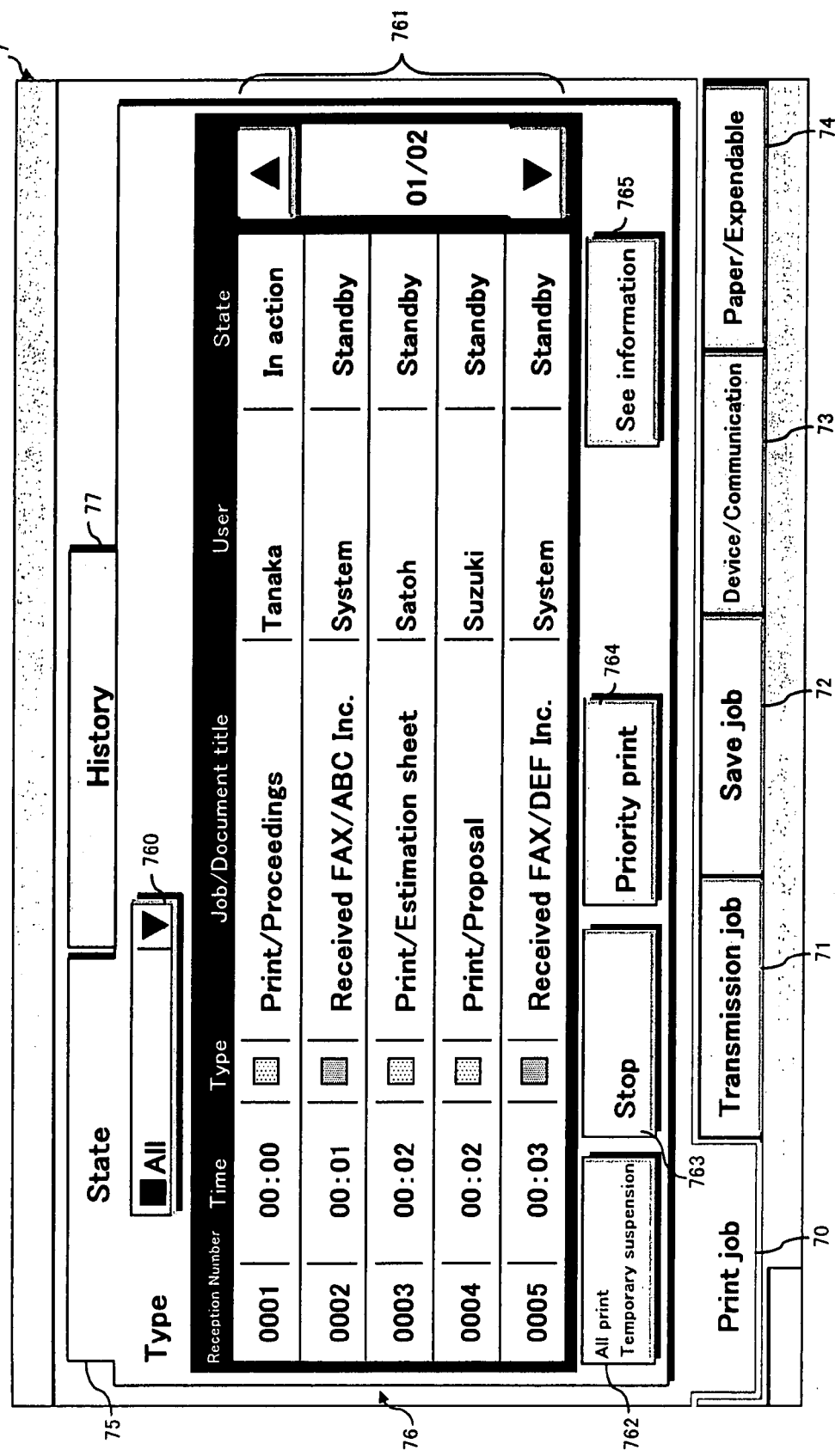
FIG. 4 is an illustration for describing a print job state check screen that is displayed on an operation part.

The operation screens are provided for each mode that corresponds to each of the special mode keys 23. For example, when the "state check/job suspension" key 230 is pressed down, the operation control part 24 detects this action and outputs it to the control part 8, and displays the state check screen as shown in FIG. 4 on the color display part 20 according to a command from the control part 8.

The control part 8 includes: a CPU for generally controlling the digital composite machine 1, a ROM in which the control programs executed by the CPU are stored; a RAM as a work area of the arithmetic processing and the like carried out by the CPU; and a peripheral circuit. Functions of a job storage unit and a job managing unit according to the present invention, which will be described later, are achieved by the CPU and the like which execute the control programs.

Figure 1:
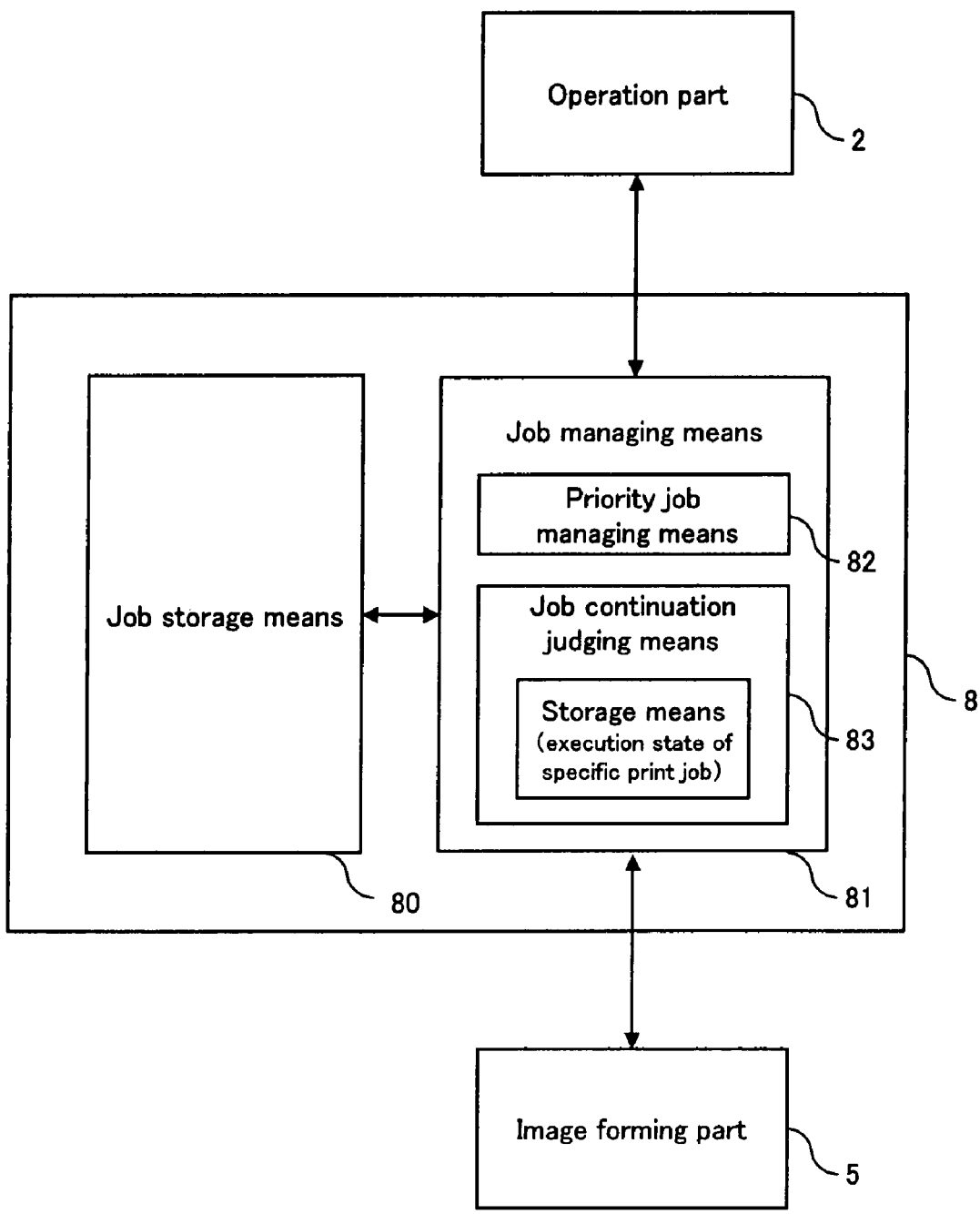
FIG. 1 is a functional block diagram of a digital composite machine as an example of the image forming apparatus according to the present invention.

As shown in FIG. 1, the block responsible for the functions in regards to the present invention is constituted with: a job storage unit 80 for storing a plurality of print jobs to a hard disk device or the RAM; the image forming unit 5 for executing the print jobs stored in the job storage unit 80; and a job managing unit 81 for executing the print jobs by the image forming unit 5 through managing the execution order of the print jobs.

The job managing unit 81 includes: priority job managing portion 82 which, during execution of a specific print job that is carried out according to the execution order set in advance, suspends the specific print job and preferentially executes another print job; and job continuation judging portion 83 for judging, at the end of the priority print job that is executed by the priority job managing portion 82, whether or not to continue the specific print job in accordance with the job execution state of the specific print job that is in action at the time of starting the priority print job.

Specifically, the job storage unit 80 stores the print job for the transcripts read out by the image reading part 4 and the print jobs received via the FAX modem 9 and the external interface 10. The job managing unit 81 manages a plurality of print jobs stored in the job storage unit 80 to execute the jobs in the stored order or in the execution order set in advance, e.g. the priority order set in a terminal that issued the print job, for example. The image forming unit 5 executes each of the plurality of print jobs as the specific print jobs, according to the execution order in accordance with a command from the job managing unit 81.

Further, the job managing unit 81 gives a command to the operation control part as necessary to display a list of the specific print jobs on the color display part 20.

When the user selects a print job to be preferentially executed from the plurality of print jobs stored in the job storage unit 80, the priority job managing portion 82 performs a control to suspend the specific print job and preferentially execute the print job that is selected by the user. That is, the job managing unit 81 gives a command to the image forming unit 5 to suspend the specific print job and execute the print job that is selected by the user as the priority print job. Further, the job managing unit 81 gives a command to the operation control part as necessary to display on the color display part 20 that the specific print job is temporarily suspended and the priority print job is being executed.

The job continuation judging portion 83 is constituted to store, in the RAM, the job execution state indicating whether the specific print job executed at the time of starting the priority print job is in the printing action or being halted. When it is stored that the specific print job is being halted, the job continuation judging portion 83 performs a control to stand by without carrying out the printing action of the specific print job when the priority print job is ended. The job continuation judging portion 83 gives a command to the image forming unit 5 to stand by without executing the specific print job until the user performs a restart operation of the specific print job.

In the followings, execution of the priority print job will be described in detail. When there is a print job that the user desires to execute preferentially among a plurality of print jobs stored in the job storage unit 80, the user presses down the "state check/job suspension" key 230 of the operation part 2. With this, the color display part 20 is switched to the operation screen of the state check mode by the operation control part.

As shown in FIG. 4, a "print job" tab 70, a "transmission job" tab 71, a "saving job" tab 72, a "device/communication" tab 73, and a "paper/expendable" tab 74 are arranged at the lower part of the operation screen 7 of the state check mode. When each tab is pressed, the operation screen is switched to each of the corresponding operation screens.

When the "print job" tab 70 is pressed in the state check mode, the print job state check screen 7 showing the processing state of the print job is displayed. When a state tab 75 arranged on the upper part thereof is pressed, a list of the processing state of the print jobs is displayed on a state display part 76 arranged in the center of the screen in the order of being stored in the job storage unit 80 and managed by the job managing unit 81 at this point. When a "history" tab 77 is pressed, a list of the processing contents of the print jobs carried out so far is displayed.

A dropdown list box 760 for selecting the kind of print jobs to be listed up is arranged above the state display part 76. When the dropdown list box 760 is operated to select the kind such as a copy job or receiving job from the displayed list, a list of the processing state and the history of the jobs of the selected kind are displayed on the state display part 76, and when "all" is selected from the list, lists of the processing states and the histories for all the jobs are displayed. A scroll button 761 is arranged on the right side of the state display part 76, and the print jobs and the histories that are not displayed on the state display part 76 can be scroll-displayed by pressing the scroll button 761.

An "all printing temporary suspension" key 762 as a key for temporarily suspending the print job, a "stop" key 763, a "priority print" key 764, and "see information" key 765 are arranged below the state display part 76. When the "all printing temporary suspension" key 762 is pressed, executions of all the print jobs stored in the job storage unit 80 are temporarily suspended.

When a row of the print job desired to be suspended is pressed among the list of the print jobs displayed on the state display part 76, the print job is selected and the row thereof is displayed with a negative/positive inversion as shown in FIG. 5. By pressing the "stop" key 763 in this state, the print job desired to be suspended is cancelled before being executed. When the "stop" key 763 is pressed without selecting the print job, the print job being executed currently is stopped and deleted.

When a row of the print job whose number of prints and the like are desired to be changed is pressed among the list of the print jobs displayed on the state display part 76, the print job is selected and the row thereof is displayed with the negative/positive inversion as shown in FIG. 5. By pressing the "see information" key 765 in this state, the job contents of that job are displayed. With this, the number of the prints and the output destination can be operated to be changed.

When a row of the print job desired to be executed preferentially is pressed among the list of the print jobs displayed on the state display part 76, the print job is selected and the row thereof is displayed with negative/positive inversion as shown in FIG. 5. By pressing the "priority print" key 764 in this state, the specific print job being executed currently is suspended, and the print job is executed preferentially as the priority print job.

In that state, the row of the priority print job is displayed on the color display part 20 with the negative/positive inversion as shown in FIG. 6, and "in action" is displayed in the "state section", while "temporarily interrupted" is displayed in the "state section" of the specific print job.

When the specific print job is being executed at the time of starting the priority print job, i.e. when the specific print job is in the printing action, the specific print job is automatically restarted after the priority print job is completed. When the print job that is desired to be executed preferentially is selected and executed as the priority print during the printing action of the specific print job, the output matters of each job may be mixed if the output destination of the specific print job is the same as that of the priority print job.

Thus, the job continuation judging portion 83 is provided to avoid mixture of the output matters through storing, in the RAM, whether or not the specific print job is in the printing action at the time of starting the priority print job, and controlling to stop the specific print job after completing the priority print job if the specific print job is being halted at that time.

That is, when the "all printing temporary suspension" key 762 is pressed while the specific print job is in the printing action, the specific print job is halted temporarily and the specific print job is intentionally suspended at the time of executing the priority print job. Then, when the print job desired to be executed preferentially is selected and the "priority print" key 764 is pressed, the specific print job is not automatically restarted even after the priority print job is completed. Thus, the mixture of the output matters can be avoided.

When the specific print job is halted after execution of the priority print job, the specific print job is restarted by pressing the "start" key of the operation part 2 after obtaining the output matters of the priority print job.

Figure 7:
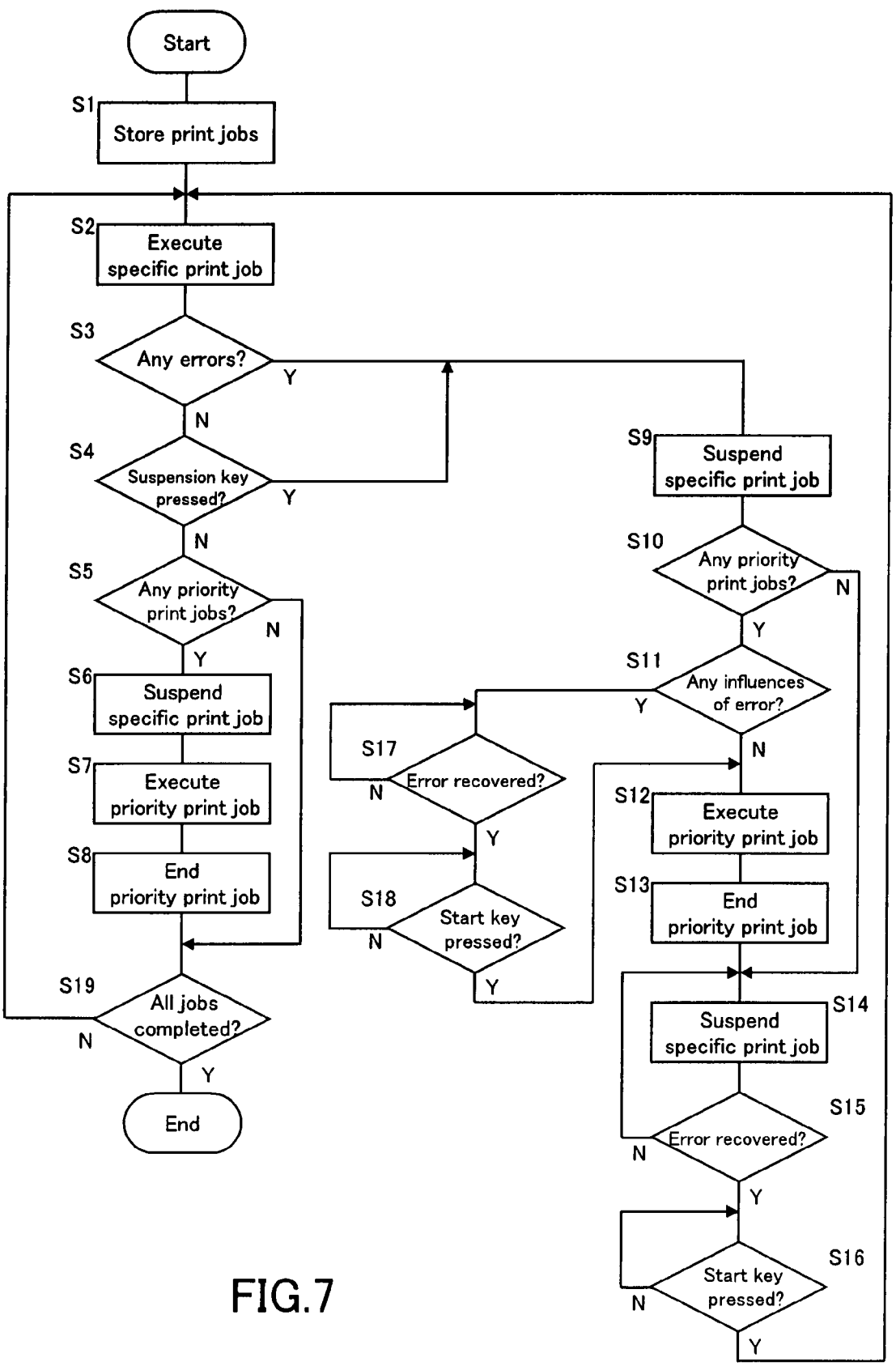
FIG. 7 is a flowchart for describing an execution process of a priority print job.

The process of the priority print job will be described hereinafter by referring to a flowchart shown in FIG. 7.

When the print job of the manuscript read out by the image reading part 4 and the print jobs received via the FAX modem 9 and the external interface 10 are stored in the job storage unit 80 (S1), the job managing unit 81 gives a command to the image forming unit 5 to execute the print jobs stored in the job storage unit 80 in accordance with the order set in advance (S2).

When there is no error generated during execution of the specific print job (S3), the "all printing temporary suspension" key 762 is not pressed (S4), the row of the print job desired to be printed preferentially is selected on the print job state check screen 7, and the "priority print" key 764 is pressed (S5), the priority job managing portion 82 gives a command to the image forming unit 5 to suspend the specific print job (S6) and execute the selected print job as the priority print job (S7).

After completing the priority print job (S8), the job continuation judging portion 83 gives a command to the image forming unit 5 to restart the specific print job automatically upon judging that the specific print job is not being halted at the time of starting the priority print job. Upon this, the specific print job is executed (S2). When all the print jobs stored in the job storage unit 80 are completed, a series of processing is ended (S19).

When there is an error generated during execution of the specific print job (S3) or the "all printing temporary suspension" key 762 is pressed (S4), the job managing unit 81 gives a command to the image forming unit 5 to suspend the specific print job (S9). When the print job that is desired to be printed preferentially is selected by operating the print job state check screen 7 in this state and the "priority print" key 764 is pressed (S10), the priority job managing portion 82 gives a command to the image forming unit 5 to execute the selected print job as the priority print job when there is no influence of an error such as running out of the paper (S11), and the priority print job is executed (S12).

In the case where there is an influence of the error such as running out of the paper (S11), when the user supplies the paper to recover from the error state (S17) and presses the "start" key 221 (S18), the priority job managing portion 81 gives a command to the image forming unit 5 to execute the selected print job as the priority print job. With this, the priority print job is executed (S12).

After completing the priority print job (S13), the job continuation judging portion 83, upon judging that the specific print job is in a halted state at the time of starting the priority print job, gives a command to the image forming unit 5 to keep the specific print job in the suspended state. With this, the specific print job is maintained to stay in the suspended state (S14).

When the "start" key 221 is pressed in this state (S16), the job managing unit 81 gives a command to the image forming unit 5 to restart the execution of the specific print job (S2). Similarly, when it is recovered from the error state (S15) through supplying the paper and so on by the user in the state where the specific print job is being suspended as in step S9, the process returns to step S2 when the "start" key 221 is pressed (S16) and execution of the specific print job is restarted.

Another embodiment will be described hereinafter. The above-mentioned embodiment is described by referring to the case where the specific print job is set to wait until the "start" key is pressed after completing the priority print job (FIG. 7, S16). However, the job managing unit 81 may be constituted with timer means provided to the job managing unit 81 to give a command to the image forming unit 5 to restart the specific print job, when it is confirmed by the timer means that a prescribed time (for example, about three minutes) has passed in the waiting time of the specific print job. The time necessary for taking out the output matters of the priority job from the tray after completing the priority print job, an arbitrary length of time between about one to five minutes, for example, may be set as the prescribed time.

Figure 8:
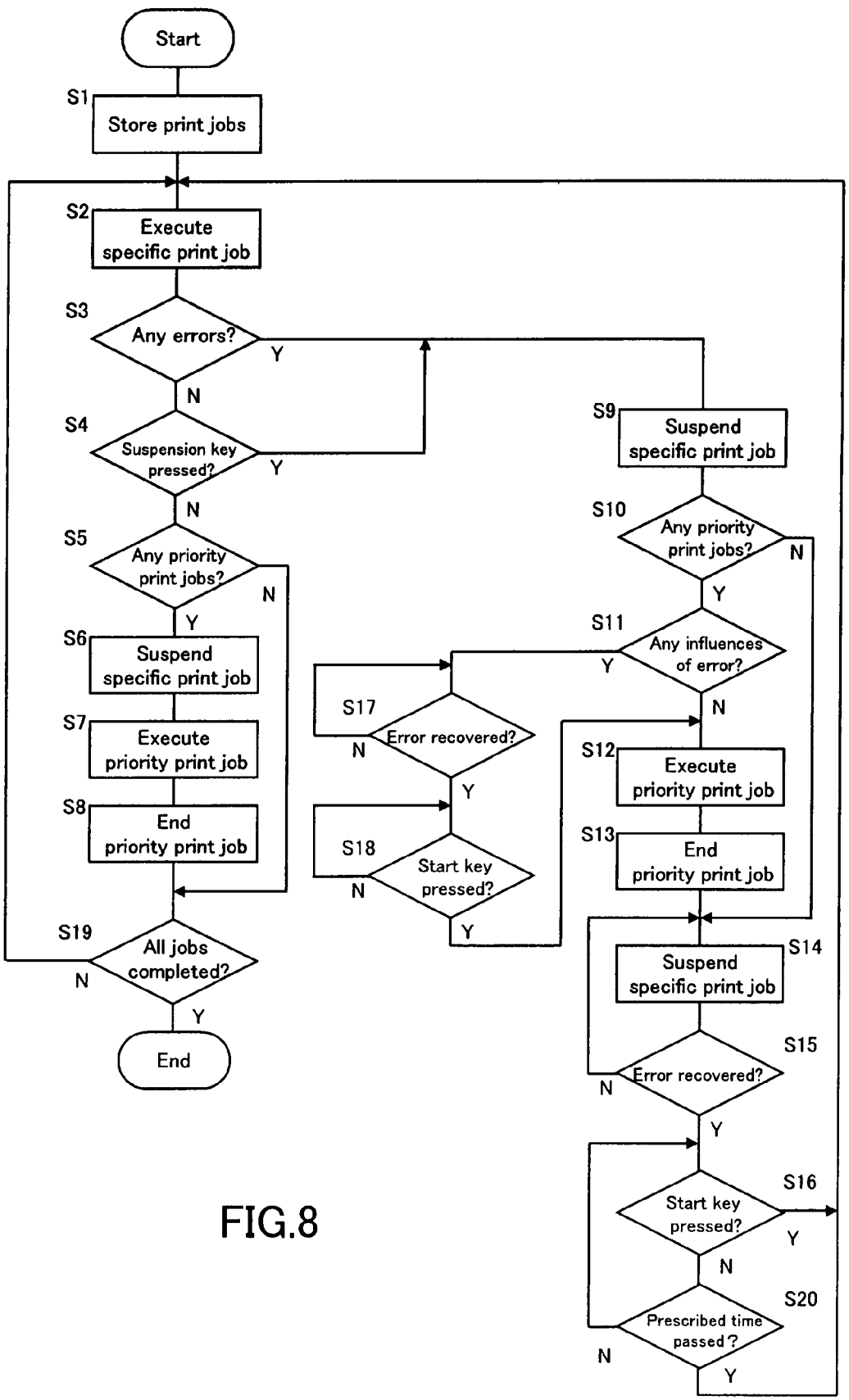
FIG. 8 is a flowchart for describing the execution process of the priority print job.

The process will be described hereinafter by referring to a flowchart shown in FIG. 8. The fundamental process is the same as the process described by referring to FIG. 7, so that only the different aspects thereof will be described herein. After completing the priority print job (S13), the job continuation judging portion 83, upon judging that the specific print job is being halted at the time of executing the priority print job, gives a command to the image forming unit 5 to keep the specific print job in the suspended state. With this, the specific print job is maintained to stay in the suspended state (S14). When the "start" key 221 is pressed in this state (S16), the job managing unit 81 gives a command to the image forming unit 5 to restart the execution of the specific print job (S2). When the "start" key 221 is not pressed, the job managing unit 81 waits until a prescribed time (for example, about three minutes) is counted by the timer means. Upon confirming that the prescribed timed is counted (S20), the job managing unit 81 gives a command to the image forming unit 5 to restart the execution of the specific print job (S2). Similarly, when it is recovered from the error state (S15) through supplying the paper and so on by the user in the state where the specific print job is being suspended as in step S9, the process returns to step S2 when the "start" key 221 is pressed (S16) and execution of the specific print job is restarted. The judgment whether or not the "start" key is pressed in the step S16 may not be necessary.

It is to be understood that the above-mentioned embodiments are taken merely as illustrative examples of the present invention, and various changes and modifications in the specific structures of each block are possible in the light of above teachings without departing from the spirit and scope of the appended claims.

What is claimed is:

1. An image forming apparatus, comprising:
   a job storage unit for storing a plurality of print jobs;
   an image forming unit for executing the print jobs stored in the job storage unit; and
   a job managing unit for managing an execution order of the print jobs carried out by the image forming unit; wherein the job managing unit comprises:
   priority job managing portion which, during execution of a specific print job carried out in accordance with an execution order set in advance, manages the image forming unit to suspend the specific print job and preferentially to execute another print job; and
   job continuation judging portion which, when completing a priority print job that is executed by the priority job managing portion, judges whether or not to continue execution of the specific print job based on a job execution state of the specific print job that is being executed when starting the priority print job.

2. The image forming apparatus according to claim 1, wherein
   when the job continuation judging portion judges that the specific print job that is being executed at a time of starting the priority print job is in a halted state, the job managing unit manages the image forming unit to stand by without executing the specific print job.

3. The image forming apparatus according to claim 2, wherein
   the job managing unit manages the image forming unit to continue execution of the specific print job after a prescribed time is passed in a waiting time of the specific print job following judgement of the halted state by the job continuation judging portion.

4. An image forming apparatus, comprising
   a job storage unit for storing a plurality of print jobs,
   an image forming unit for executing, in a prescribed order, the print jobs stored in the job storage unit,
   a priority key which, during execution of a specific print job carried out in accordance with an execution order set in advance, suspends the specific print job and preferentially executes another print job, and
   a stop key for temporarily stopping a print job that is being executed, wherein
   the image forming unit continues execution of the specific print job when completing a priority print job that corresponds to an operation of the priority print key, and
   when the priority print key is operated at a time of stopping the specific print job by an operation of the stop key, the image forming unit discontinues the specific print job and stands by when the priority print job is completed.

5. The image forming apparatus according to claim 4, further comprising:

a start key for starting an image forming action, wherein the image forming unit continues execution of the specific print job when the start key is operated while the image unit is in stand by in a waiting time where the specific print job is discontinued.

6. The image forming apparatus according to claim 4, wherein the image forming unit continues execution of the specific print job, when a prescribed time is passed while the image unit is in stand by in a waiting time where the specific print job is discontinued.

7. The image forming apparatus according to claim 5, wherein the image forming unit continues execution of the specific print job after a prescribed time is passed without the start key being operated in a waiting time where the specific print job is discontinued.

* * * * *